United States Patent Office 2,840,581
Patented June 24, 1958

2,840,581
CARBONYLOXY STEROIDS

John A. Hogg, Kalamazoo Township, and Jerome Korman, Portage Township, Kalamazoo County, Mich., assignors to The Upjohn Company, Kalamazoo, Mich., a corporation of Michigan No Drawing. Application December 17, 1956
Serial No. 628,549

5 Claims. (Cl. 260—397.45)

This invention relates to steroid chemistry and is more particularly concerned with novel 19-nor-1,3,5(10), 17(20)-pregnatetraene-3,21-diols of the formula

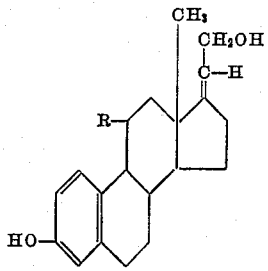

wherein R is selected from the group consisting of hydrogen, hydroxy, and keto.

This application is a continuation-in-part of our copending application Serial No. 406,364, now Patent No. 2,774,775, filed January 26, 1954.

It is an object of this invention to provide such novel compounds, as herein described, which are useful, for example, in having estradiol-like activity and are further useful in the production of physiologically active steroid hormones having estradiol-like or adrenal cortical hormone activity. Illustratively, the 19-nor-1,3,5(10),17(20)-pregnatetraene-3,21-diols of the present invention are reduced by the Birch reaction to produce the Δ⁴-3-keto group in the A ring. Esterification of the 21-hydroxy group with, for example, acetic anhydride, followed by the introduction of the 17α-hydroxy-20-keto group with hydrogen peroxide and a small amount of osmium tetroxide is productive of esters of the physiologically active 10-normethyladrenal cortical hormones, e. g. 10-normethylcortisone acetate, 10-normethylhydrocortisone acetate, and 10-normethyl-11-desoxyhydrocortisone acetate, and the 11α-hydroxy isomer of 10-normethylhydrocortisone acetate.

The 19-nor-1,3,5(10),17(20)-pregnatetraene-3,21-diol compounds of the present invention, as illustrated by the foregoing structural formula, can be prepared by lithium aluminum hydride reduction of the corresponding alkyl 3-hydroxy-19-nor-1,3,5(10),17(20)-pregnatetraen-21-oates as described in our copending application Serial No. 406,364, now Patent No. 2,774,775, as illustrated by Example 1. The 19-nor-1,3,5(10),17(20)-pregnatetraene-3,21-diols of this invention also can be prepared by pyrolyzing a corresponding 21-hydroxy-1,4,17(20)-cis-pregnatrien-3-one, as illustrated by Example 2.

It is to be understood that within the scope of the present invention are included certain ethers and esters of the foredescribed 19-nor-1,3,5(10),17(20)-pregnatetraene-3,21-diols of this invention, namely, 19-nor-1,3,5(10),17(20)-pregnatetraene-3,11α(and β),21-triol 3-, 11-, and 21-monoesters, 3,11-, 3,21-, and 11,21-diesters, and 3,11,21-triesters; 3-etherified 19-nor-1,3,5(10), 17(20)-pregnatetraene-3,11α(and β),21-triol 11- and 21- monoesters and 11,21-diesters; 19-nor-1,3,5(10),17(20)-pregnatetraene-3,21-diol 3- and 21-monoesters and 3,21-diesters; 3-etherified 19-nor-1,3,5(10),17(20)-pregnatetraene-3,21-diol 21-esters; 3,21-dihydroxy-19-nor-1,3,5(10), 17(20)-pregnatetraen-11-one 3- and 21-monoesters and 3,21-diesters; and 3-etherified 3,21-dihydroxy-19-nor-1,3,5(10),17(20)-pregnatetraen-11-one 21-esters. Generally the etherified and esterified hydroxy groups each contain less than forty atoms. Preferably said groups are hydrocarbonoxy [hydrocarbon—O—] and hydrocarboyloxy

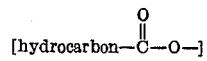

radicals, respectively, each containing less than twelve carbon atoms. In an especially preferred embodiment said groups are alkoxy and alkanoyloxy radicals, respectively, each containing from one to eight carbon atoms, inclusive. The most preferred embodiment of said groups are methoxy and acetoxy, respectively. Illustrative etherified hydroxy groups are methoxy, ethoxy, propoxy, butyroxy, valeroxy, hexoxy, heptoxy, octanoxy, β-trichloro-α-acetylethoxy, chloromethoxy, β-hydroxyethyleneoxy, dimethylmethoxy, diethylmethoxy, isobutyroxy, isovaleroxy, α-tetrahydropyranyloxy, α and β-naphthyloxy, cyclohexyloxy, cyclopentyloxy, β,β-dicarbethoxyethenyloxy, β-keto-cyclohexenyloxy, α,β-dimethylethoxy, α,β- and β,β-diethylethoxy, benzoxy, ortho, meta and para-tolyloxy, α and β-phenylethyloxy, β-indolyloxy, α-furyloxy, α and β-cyclohexylethyleneoxy, ortho, meta and para-nitrobenzoxy, ortho, meta and para-aminobenzoxy, etc. Illustrative esterified hydroxy groups are those containing acyl radicals of the acids formic, propionic, butyric, isobutyric, valeric, isovaleric, trimethylacetic, 2-methylbutyric, 3-ethylbutyric, hexanoic, diethylacetic, triethylacetic, heptanoic, octanoic, optically active abietic, α - ethylisovaleric, cyclopropylideneacetic, cyclopentylformic, cyclopentylacetic, α and β-cyclopentylpropionic, cyclohexylformic, cyclohexylacetic, α and β-cyclohexylpropionic, benzoic, 2, 3 or 4-methylbenzoic, 2,3-, 2,4-, 2,5-, 2,6-, 3,4- and 3,5-dimethylbenzoic, ethylbenzoic, 2,4,6-trimethylbenzoic, 2,4,6-triethylbenzoic, α-naphthoic, 3-methyl-α-naphthoic, phenylacetic, α and β-phenylpropionic, diphenylacetic, triphenylacetic, succinic, glutaric, α-methylglutaric, β-methylglutaric, β,β-dimethylglutaric, adipic, pimelic, suberic, glycolic, lactic, citric, tartaric, 3-methyl-α-naphthoic, phenylacetic, α and β-phenylpropid-maleic, d-glyceric, malonic, gluconic, salicylic, glycine, diglycollamic, triglycollamic, methylglycine, dimethylglycine, diethylglycine, para-aminosalicylic, para-aminobenzoic, ethylmercaptoacetic, benzylmercaptoacetic, cyanoacetic, chloroacetic, fluoroacetic, trichloroacetic, trifluoroacetic,thioglycolic, 2,3,4-trimethoxybenzoic, α-naphthoxyacetic, β-pyrrolidylpropionic, carbamic acid, phenylcarbamic, n-butylcarbamic, dimethylcarbamic, diethylcarbamic, allophanic, β-furylcarboxylic, N-methylpyrrolidyl-2-carboxylic, α-picolinic, indole-2-carboxylic, 6-hydroxyindolyl-3-acetic, N-methylmorpholyl-2-carboxylic, pyrrolyl-2-carboxylic, etc.

The following examples are illustrative only and are not to be construed as limiting the scope of this invention.

EXAMPLE 1

*19-nor-1,3,5(10),17(20)-pregnatetraene-3,11β,21-triol*

A solution of 300 milligrams of methyl 3,11β-dihydroxy-19-nor-1,3,5(10),17(20)-pregnatetraen-21-oate in ten milliliters of dry ether is added dropwise at 26 degrees centigrade to a solution of 500 milligrams of lithium aluminum hydride in ten milliliters of ether. The resulting solution is stirred for 1.5 hours at room temperature and ten milliliters of ethyl acetate followed by fifteen milliliters of water are cautiously added to the mixture to decompose the excess lithium aluminum hydride. The mixture is made slightly acidic at zero degrees centigrade with dilute hydrochloric acid and then extracted thoroughly with ether. The ether extracts are combined, dried and the solvent distilled to leave a residue of 19-nor-1,3,5(10),17(20)-pregnatetraene-3,11β,21-triol. Recrystallized from ethyl acetate the compound melts at 196 to 198 degrees centigrade.

EXAMPLE 2

*19-nor-1,3,5(10),17(20)-pregnatetraene-3,11β,21-triol*

A pyrolysis tube of 2.5-centimeter diameter hard glass (Vycor) is mounted vertically and packed with one-millimeter diameter and five-millimeter long hard glass (Vycor) rings, and a thirty-centimeter length of the pyrolysis tube is heated by a combustion furnace. The influent liquid is forced by nitrogen gas under pressure from a reservoir through a flowmeter into the pyrolysis tube. The effluent gases and liquid are collected in a receiver cooled in ice and vented to an exhaust system. Reaction temperatures are measured by a thermocouple mounted inside the tube immediately outside of the heated zone exit, providing the temperature of the effluent liquid, and a thermocouple mounted between the pyrolysis tube and the furnace. A suspension of twenty grams of 11β,21-dihydroxy-1,4,17(20)-cis-pregnatrien-3-one in two liters of heavy mineral oil is prepared by efficient mixing (Waring blender for fifteen minutes), and the suspension is passed through the pyrolysis tube at a rate of ten milliliters per minute maintaining the temperature of the effluent liquid at 400 degrees centigrade, the thermocouple between the pyrolysis tube and the furnace reading 650 degrees centigrade. After completion of the pyrolysis reaction, the cooled effluent liquid is extracted with five percent aqueous sodium hydroxide solution, the extract acidified with dilute aqueous hydrochloric acid, and the acidified aqueous solution extracted with methylene chloride. Distillation of the methylene chloride gives eight grams of solid. This solid is chromatographed over 640 grams of magnesium silicate (Florisil). Using 1:4 acetone-hexane (Skellysolve B) mixture as the solvent provides 4.8 grams of solid. Recrystallization of this solid from ethyl acetate provides 2.9 grams of purified 19-nor-1,3,5(10),17(20)-pregnatetraene-3,11β,21-triol; melting point 197 to 199 degrees centigrade. A sample further recrystallized from methanol for analytical purposes melts at 199.5 to 202 degrees centigrade; $[\alpha]_D^{24}$ is plus 110 degrees in acetone.

*Analysis.*—Calculated for $C_{20}H_{28}O_3$: C, 76.40; H, 8.44. Found: C, 76.62; H, 8.66.

EXAMPLE 3

*3-methoxy-19-nor-1,3,5(10),17(20)-pregnatetraene-11β,21-diol*

A solution of 7.7 grams of 19-nor-1,3,5(10),17(20)-pregnatetraene-3,11β,21-triol and 33 grams of potassium hydroxide in 170 milliliters of water is prepared and eleven 4-milliliter portions of dimethyl sulfate is added, with stirring, at fifteen-minute intervals. The crude solid product is isolated by filtration. The solid is chromatographed over magnesium silicate (Florisil) using acetone-hexane (Skellysolve B) solvent to provide 4.5 grams of 3-methoxy-19-nor-1,3,5(10),17(20)-pregnatetraene-11β,21-diol. Recrystallization of the product from ethyl acetate provides 3.9 grams of purified product; melting point 141 to 144 degrees centigrade. Further recrystallized the product melts at 143 to 144 degrees centigrade; $[\alpha]_D^{24}$ is plus 122 degrees in chloroform.

*Analysis.*—Calculated for $C_{21}H_{28}O_3$: C, 76.79; H, 8.59. Found: C. 76.94; H, 8.74.

By substituting diethyl sulfate for the dimethyl sulfate in the foregoing procedure 3-ethoxy-19-nor-1,3,5(10),17(20)-pregnatetraene-11β,21-diol is prepared. In place of the dialkyl sulfate, other etherifying agents can be employed, e. g. the paratoluenesulfonic acid ester of an alcohol, according to prior art procedure. In the same manner other 3-ethers are prepared from the 3-hydroxysteorid and the appropriate esterifying agent, including 3-benzyloxy-, 3-propoxy-, 3-(β-hydroxyethoxy)-, 3-butyroxy-, 3-(β,β-diethylethoxy)-, 3-(β-methoxyethoxy)-, 3-(α-naphthoxy)-, 3-(α-furyloxy)-, 3-isovaleroxy-, 3-cyclohexyloxy-, 3-benzoxy, 3-octanoxy-, and 3-(β-phenylethoxy)-19-nor-1,3,5(10),17(20)-pregnatetraene-11β,21-diol, and other 3-ethers of 19-nor-1,3,5(10),17(20)-pregnatetraene-3,11β,21-triol wherein the 3-etherified hydroxyl groups include those named in the foregoing description.

EXAMPLE 4

*3-methoxy-11β,21-diacetoxy-19-nor-1,3,5(10),17(20)-pregnatetraene*

Acetylation of 2.82 grams of 3-methoxy-19-nor-1,3,5(10),17(20)-pregnatetraene-11β,21diol by warming with twenty milliliters of acetic anhydride and twenty milliliters of dry pyridine, and then chromatographing the product over magnesium silicate (Florisil) using acetone-hexane (Skellysolve B) mixture for elution, gives 3.17 grams of 3-methoxy-11β,21-diacetoxy-19-nor-1,3,5(10),17(20)-pregnatetraene.

In the same manner other 11β,21-diester compounds are prepared from the 3-etherified 19-nor-1,3,5(10),17(20)-pregnatetraene-3,11β,21-triols of Example 2 by reaction with the appropriate acid chloride or acid anhydride, including 3-ethoxy-11β,21-dipropionyloxy-, 3-benzoxy-11β,21-diisovaleryloxy-, 3-octanoxy-11β,21-di-(trimethylacetoxy)-, 3-(β-hydroxyethoxy)-11β,21-di-(β-cyclopentylpropionyloxy)-3-cyclohexyloxy-11β,21-dibenzoyloxy-, and 3-methoxy-11β,21-di-(α-furoyloxy)-19-nor-1,3,5(10),17(20)-pregnatetraene, and other 11β,21-diesters of the 3-etherified 19-nor-1,3,5(10),17(20)-pregnatetraene-3,11β,21-triols of Example 2 wherein the 11β and 21-esterified hydroxyl groups include those named previously in the description.

EXAMPLE 5

*3,11β,21-triacetoxy-19-nor-1,3,5(10),17(20)-pregnatetraene*

Acetylation of 610 milligrams of 19-nor-1,3,5(10),17(20)-pregnatetraene-3,11β,21-triol with acetic acid in pyridine according to the procedure of Example 3 gives 660 milligrams of 3,11β,21-triacetoxy-19-nor-1,3,5(10),17(20)-pregnatetraene which is purified by chromatographing over magnesium silicate (Florisil) using acetone-hexane (Skellysolve B) mixture for elution.

In the same manner other 3,11β,21-triester compounds are prepared from 19-nor-1,3,5(10),17(20)-pregnatetraene-3,11β,21-triol by reaction with the appropriate acid chloride or acid anhydride, including 3,11β,21-tributyryloxy-, 3,11β,21-tri(phenylacetoxy)-, 3,11β,21 - tri - (para-toluoyloxy)-, 3,11β,21-tricyclohexanoyloxy-, and 3,11β,21-tri-(β-furylcarbonyloxy)-19 - nor - 1,3,5(10),17(20)-pregnatetraene, and other 3,11β,21-triesters of 19-nor-1,3,5(10),17(20)-pregnatetraene-3,11β,21-triol wherein the 3,11β and 21-esterified hydroxyl groups include those named in the foregoing description.

EXAMPLE 6

*3,21-diacetoxy-19-nor-1,3,5(10),17(20)-pregnatetraen-11β-ol*

A solution of 200 milligrams (0.638 millimole) of 19-nor-1,3,5(10),17(20)-pregnatetraene-3,11β,21-triol, three milliliters of pyridine, and 0.13 milliliter (1.4 millimoles) of acetic anhydride is maintained at a temperature of 25 degrees centigrade for seventeen hours. The solution then is diluted with methylene dichloride and washed well with dilute aqueous hydrochloric acid solution. The washed methylene dichloride solution is dried over anhydrous sodium sulfate and then chromatographed over fifteen grams of magnesium silicate (Florisil) using mixtures of hexane (Skellysolve B) and acetone for elution. After evaporation of the solvent, a 176-milligram sample of 3,21-diacetoxy-19-nor-1,3,5(10),17(20)-pregnatetraen-11β-ol is obtained. The material is crystallized from methanol to achieve further purification.

In the same manner are prepared other 3,21-diester of 19-nor-1,3,5(10),17(20)-pregnatetraene - 3,11β,21 - triol and 21-esters of the 3-etherified 19-nor-1,3,5(10),17(20)-pregnatetraene-3,11β,21-triols of Example 2, including those wherein the esterified hydroxyl groups are those named in the description and previous examples.

Example 7

19-nor-1,3,5(10),17(20)-pregnatetraene-3,11α,21-triol

An ether solution of 3,11α-dihydroxy - 19 - nor-1,3,5(10),17(20)-pregnatetraen-21-oate is reduced with lithium aluminum hydride in ether to produce 19-nor-1,3,5(10),17(20)-pregnatetraene-3,11α,21-triol following the procedure of Example 1 for the reduction of the corresponding 11β-hydroxy compound.

Example 8

19-nor-1,3,5(10),17(20)-pregnatetraene-3,21-diol 3-hydroxy-19-nor-1,3,5(10),17(20) - pregnatetraen-21-oate is reduced with lithium aluminum hydride in ether solution, following the procedure of Example 1 for the reduction of the corresponding 11β-hydroxy substituted compound, to produce 19-nor-1,3,5(10),17(20)-pregnatetraene-3,21-diol.

Example 9

3,21-dihydroxy-19-nor-1,3,5(10),17(20)-pregnatetraen-11-one

A suspension of 21-hydroxy-1,4,17(20)-cis-pregnatriene-3,11-dione in heavy mineral oil is pyrolyzed to produce 3,21-dihydroxy-19-nor-1,3,5(10),17(20)- pregnatetraen-11-one following the procedure of Example 2 for the pyrolysis of the corresponding 11β-hydroxy compound.

3,21 - dihydroxy - 19 - nor - 1,3,5(10),17(20) - pregnatetraen-11-one also is produced by oxidation of 3,21-diacetoxy-19-nor-1,3,5(10),17(20) - pregnatetraen-11β-ol with chromic acid in acetic acid solution at room temperature (between about twenty and about thirty degrees centigrade) to produce 3,21-diacetoxy-19-nor-1,3,5(10),-17(20)-pregnatetraen-11-one, followed by hydrolysis of the 3 and 21-acetate ester groups with sodium carbonate in methanol solution at room temperature to produce 3,21-dihydroxy-19-nor-1,3,5(10),17(20) - pregnatetraen-11-one.

Example 10

19-nor-1,3,5(10),17(20)-pregnatetraene-3,21-diol

Following the procedure of Example 2 for the conversion of 11β,21-dihydroxy - 1,4,17(20)-cis-pregnatrien-3-one to 19-nor-1,3,5(10),17(20)-pregnatetraene-3,11β,21-triol, 21 - hydroxy-1,4,17(20) - cis-pregnatrien-3-one is pyrolyzed to produce 19-nor-1,3,5(10),17(20)-pregnatetraene-3,21-diol identical with the compound of Example 8.

Example 11

19-nor-1,3,5(10),17(20)-pregnatetraene-3,11α,21-triol

In exactly the same manner as the corresponding 11β-hydroxy compound is pyrolyzed in Example 2, 11α,21-dihydroxy-1,4,17(20)-cis-pregnatrien-3-one is pyrolyzed to produce 19 - nor - 1,3,5(10),17(20)-pregnatetraene-3,11α,21-triol identical with the compound of Example 7.

Example 12

3-methoxy-19-nor-1,3,5(10),17(20)-pregnatetraene-11α,21-diol

An aqueous solution of 19-nor-1,3,5(10),17(20)-pregnatetraene-3,11α,21-triol containing potassium hydroxide is prepared and dimethyl sulfate is added with stirring, following the etherification procedure of Example 3. The crude solid product is isolated by filtration. The solid is chromatographed over magnesium silicate (Florisil) using acetone-hexane (Skellysolve B) solvent to provide 3-methoxy - 19 - nor - 1,3,5(10),17(20) - pregnatetraene-11α,21-diol.

By substituting diethyl sulfate for the dimethyl sulfate in the foregoing procedure 3-ethoxy-19-nor-1,3,5(10),-17(20)-pregnatetraene-11α,21-diol is prepared. In place of the dialkyl sulfate, other etherifying agents can be employed, e. g. the para-toluenesulfonic acid ester of an alcohol, according to prior art procedure. In the same manner other 3-ethers are prepared from the 3-hydroxysteroid and the appropriate esterifying agent, including 3-benzyloxy-, 3-propoxy-, 3-(β-hydroxyethoxy)-, 3-butyroxy-, 3-(β,β-diethylethoxy)-, 3-(β-methoxyethoxy)-, 3-(α-naphthoxy)-, 3-(α-furyloxy)-, 3-isovaleroxy-, 3-cyclohexyloxy-, 3-benzoxy-, 3-octanoxy-, and 3-(β-phenylethoxy)-19-nor-1,3,5(10),17(20)-pregnatetraene - 11α,21-diol, and other 3-ethers of 19-nor-1,3,5(10),17(20)-pregnatetraene-3,11α,21-triol wherein the 3-etherified hydroxyl groups include those named in the foregoing description.

Example 13

3-methoxy-11α,21-diacetoxy-19-nor-1,3,5(10),17(20)-pregnatetraene

Acetylation of 3 - methoxy-19-nor-1,3,5(10),17(20)-pregnatetraene-11α,21-diol by warming with acetic anhydride and dry pyridine, according to the esterification procedure of Example 4, and then chromatographing the product over magnesium silicate (Florisil) using acetone-hexane (Skellysolve B) mixture for elution, gives 3-methoxy - 11α,21 - diacetoxy-19-nor-1,3,5(10),17(20)-pregnatatraene.

In the same manner other 11α,21-diester compounds are prepared from the 3-etherified 19-nor-1,3,4,(10),-17(20)-pregnatetraene-3,11α,21-triols of Example 12 by reaction with the appropriate acid chloride or acid anhydride, including 3-ethoxy-11α,21-dipropionyloxy-, 3-benzoxy-11α,21-diisovaleryloxy-, 3-octanoxy - 11α,21-di-(trimethylacetoxy)-, 3-(β - hydroxyethoxy) - 11α,21-di-(β-cyclopentylpropionyloxy)-, 3-cyclohexyloxy - 11α,21-dibenzoyloxy-, and 3-methoxy-11α,21-di-(α-furoyloxy)-19-nor-1,3,5(10),17(20)-pregnatetraene, and other 11α,21-diesters of the 3-etherified 19-nor-1,3,5(10),17(20)-pregnatetraene-3,11α,21-triols of Example 12 wherein the 11α- and 21-esterified hydroxyl groups include those named previously in the description.

Example 14

3,11α,21-triacetoxy-19-nor-1,3,5(10),17(20)-pregnatetraene

Acetylation of 19-nor-1,3,5(10),17(20)-pregnatetraene-3,11α,21-triol with acetic acid in pyridine according to the procedure of Example 4 gives 3,11α,21-triacetoxy-19-nor-1,3,5(10),17(20)-pregnatetraene which is purified by chromatographing over magnesium silicate (Florisil) using acetone-hexane (Skellysolve B) mixture for elution.

In the same manner other 3,11α,21-triester compounds are prepared from 19-nor-1,3,5(10),17(20)-pregnatetraene-3,11α,21-triol by reaction with the appropriate acid chloride or acid anhydride, including 3,11α,21-tributyryloxy-, 3,11α,21 - tri - (phenylacetoxy)-, 3,11α,21-tri-para-toluoyloxy)-, 3,11α,21-tricyclohexanoyloxy-, and 3,11α, 21-tri-(β-furylcarbonyloxy)-19 - nor - 1,3,5(10),17(20)-pregnatetraene, and other 3,11α,21-tri-esters of 19-nor- 1,3,5(10),17(20)-pregnatetraene - 3,11α,21 - triol wherein the 3,11α and 21-esterified hydroxyl groups include those named in the foregoing description.

EXAMPLE 15
*3,21-diacetoxy-19-nor-1,3,5(10),17(20)-pregnatetraen-11α-ol*

A solution of 19 - nor - 1,3,5(10),17(20) - pregnatetraene-3,11α,21-triol, pyridine, and acetic anhydride is maintained at a temperature of 25 degrees centigrade for sixteen hours. The solution then is diluted with methylene dichloride and washed well with dilute aqueous hydrochloric acid solution. The washed methylene dischloride solution is dried over anyhdrous sodium sulfate and then chromatographed over magnesium silicate (Florisil) using mixtures of hexane (Skellysolve B) and acetone for elution. After evaporation of the solvent 3,21 - diacetoxy - 19 - nor - 1,3,5(10),17(20)-pregnatetraen-11α-ol is obtained. The material is crystalized from methanol to achieve further purification.

In the same manner are prepared other 3,21-diesters of 19-nor-1,3,5(10),17(20) - pregnatetraene - 3,11α,21 - triol and 21-esters of the 3-etherified 19-nor-1,3,5(10),17(20)-pregnatetraene-3,11α,21-triols of Example 12, including those wherein the esterified hydroxyl groups are those named in the description and previous examples.

EXAMPLE 16
*3-methoxy-21-hydroxy-19-nor-1,3,5(10),17(20)-pregnatetraen-11-one*

An aqueous solution of 3,21-dihydroxy-19-nor-1,3,5(10),17(20)-pregnatetraen-11-one containing potassium hydroxide is prepared and dimethyl sulfate is added with stirring, following the etherification procedure of Example 3. The crude solid product is isolated by filtration. The solid is chromatographer over magnesium silicate (Florisil) using acetone-hexane (Skellysolve B) solvent to provide 3-methoxy - 21 - hydroxy - 19 - nor - 1,3,5(10), 17(20)-pregnatetraen-11-one.

By substituting diethyl sulfate for the dimethyl sulfate in the foregoing procedure 3-ethoxy-21-hydroxy-19-nor-1,3,5(10),17(20)-pregnatetraen-11-one is prepared. In place of the dialkyl sulfate, other etherifying agents can be employed, e. g. the para-toluenesulfonic acid ester of an alcohol, according to prior art procedure. In the same manner other 3-ethers are prepared from the 3-hydroxysteroid and the appropriate esterifying agent, including 3-benzyloxy-, 3-propoxy-, 3-(β-hydroxyethoxy-, 3 - butyroxy-, 3 - (β,β-diethylethoxy)-, 3 - (β-methoxyethoxy)-, 3-(α-naphthoxy)-, 3-(α-furyloxy)-, 3-isovaleroxy-, 3-cyclohexyloxy-, 3-benzoxy, 3-octanoxy-, and 3-(β-phenylethoxy)-21-hydroxy-19 - nor - 1,3,5(10),17(20)-pregnatetraen-11-one and other 3-ethers of 3,21-dihydroxy-19-nor-1,3,5(10),17(20)-pregnatetraen-11-one wherein the 3-etherified hydroxyl groups include those named in the foregoing description.

EXAMPLE 17
*3-methoxy-21-acetoxy-19-nor-1,3,5(10),17(20)-pregnatetraen-11-one*

Acetylation of 3-methoxy-21-hydroxy-19-nor-1,3,5(10), 17(20)-pregnatetraen-11-one by warming with acetic anhydride and dry pyridine, according to the esterification procedure of Example 4, and then chromatographing the product over magnesium silicate (Florisil) using acetone-hexane (Skellysolve B) mixture for elution, gives 3-methoxy-21-acetoxy-19 - nor - 1,3,5(10),17(20)-pregnatetraen-11-one.

EXAMPLE 18
*3,21-diacetoxy-19-nor-1,3,5(10),17(20)-pregnatetraen-11-one*

A solution of 3,21-dihydroxy-19-nor-1,3,5(10),17(20)-pregnatetraen-11-one, pyridine, and acetic anhydride is maintained at a temperature of 25 degrees centigrade for sixteen hours. The solution then is diluted with methylene dichloride and washed well with dilute aqueous hydrochloric acid solution. The washed methylene dichloride solution is dried over anhydrous sodium sulfate and then chromatographed over magnesium silicate (Florisil) using mixtures of hexane (Skellysolve B) and acetone for elution. After evaporation of the solvent, 3,21-diacetoxy-19 - nor - 1,3,5(10),17(20)-pregnatetraen-11-one is obtained.

EXAMPLE 19
*3,21-diacetoxy-19-nor-1,3,5(10),17(20)-pregnatetraene*

Acetylation of 19-nor-1,3,5(10),17(20)-pregnatetraene-3,21-diol with acetic acid in pyridine according to the procedure of Example 4 gives 3,21-diacetoxy-19-nor-1,3,5(10),17(20) - pregnatetraene which is purified by chromatographing over magnesium silicate (Florisil) using acetone-hexane (Skellysolve B) mixture for elution.

In the same manner other 3,21-diester compounds are prepared from 19-nor-1,3,5(10),17(20)-pregnatetraene-3,21-diol by reaction with the appropriate acid chloride or acid anhydride, including 3,21-dibutyryloxy-, 3,21-di-(phenylacetoxy)-, 3,21-di-(para-toluoyloxy)-, 3,21-dicyclohexanoyloxy-, and 3,21-di-(β-furylcarbonyloxy)-19-nor-1,3,5(10),17(20)-pregnatetraene, and other 3,21-diesters of 19 - nor - 1,3,5(10),17(20) - pregnatetraene - 3,21-diol wherein the 3 and 21-esterified hydroxyl groups include those named in the foregoing description.

It is to be understood that the invention is not to be limited to the exact details or exact compounds shown and described as obvious modifications and equivalents will be apparent to one skilled in the art, and the invention is therefore to be limited only by the scope of the appended claims.

We claim:

1. 19-nor-1,3,5(10),17(20)-pregnatetraene - 3,21 - diols of the formula

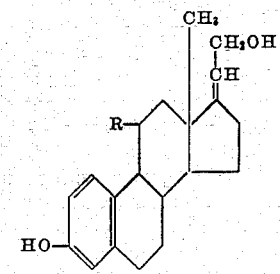

wherein R is selected from the group consisting of hydrogen, hydroxy, and keto.

2. 19-nor-1,3,5(10),17(20) - pregnatetraene - 3,21-diol.
3. 19-nor-1,3,5(10),17(20) - pregnatetraene - 3,11β,21-triol.
4. 19-nor-1,3,5(10),17(20) - pregnatetraene - 3,11α,21-triol.
5. 3,21-dihydroxy-19-nor-1,3,5(10),17(20) - pregnatetraen-11-one.

References Cited in the file of this patent

UNITED STATES PATENTS 2,774,775   Korman _____ Dec. 18, 1956